United States Patent
Joos et al.

(10) Patent No.: US 11,001,301 B2
(45) Date of Patent: May 11, 2021

(54) METHOD FOR MOVING A MOTOR VEHICLE OUT OF A PARKING SPACE WITH AT LEAST SEMI-AUTONOMOUS MANOEUVRING OF THE MOTOR VEHICLE UP TO AN END POSITION, DRIVER ASSISTANCE SYSTEM AND MOTOR VEHICLE

(71) Applicant: VALEO Schalter und Sensoren GmbH, Bietigheim-Bissingen (DE)

(72) Inventors: Malte Joos, Bietigheim-Bissingen (DE); Mohamed Mahmoud, Bietigheim-Bissingen (DE); Frank Blinkle, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 361 days.

(21) Appl. No.: 16/071,095

(22) PCT Filed: Jan. 19, 2017

(86) PCT No.: PCT/EP2017/051047
§ 371 (c)(1),
(2) Date: Apr. 12, 2019

(87) PCT Pub. No.: WO2017/125471
PCT Pub. Date: Jul. 27, 2017

(65) Prior Publication Data
US 2019/0233009 A1     Aug. 1, 2019

(30) Foreign Application Priority Data

Jan. 21, 2016   (DE) .......................... 102016100993.8

(51) Int. Cl.
*B62D 15/02*     (2006.01)
*B60Q 9/00*      (2006.01)
(Continued)

(52) U.S. Cl.
CPC ....... *B62D 15/0285* (2013.01); *G05D 1/0088* (2013.01); *G05D 1/0223* (2013.01); *B60W 2554/00* (2020.02)

(58) Field of Classification Search
CPC ...... B62D 15/02; B62D 15/0285; B60Q 9/00; B60W 30/06; B60W 10/04; G05D 1/02;
(Continued)

(56) References Cited

U.S. PATENT DOCUMENTS 6,035,734 A *  3/2000  Le Van ................ B60K 28/165
                                              477/174
6,275,754 B1 * 8/2001  Shimizu ............. B62D 15/0285
                                              180/167
(Continued)

FOREIGN PATENT DOCUMENTS

DE      102009060165 A1     6/2011
DE      10 2010 030208 A1   12/2011
(Continued)

OTHER PUBLICATIONS

The Notice of Preliminary Rejection issued in corresponding Korean Application No. 10-2018-7023800, dated Feb. 25, 2020 (14 pages).
(Continued)

*Primary Examiner* — Yuri Kan
(74) *Attorney, Agent, or Firm* — Osha Bergman Watanabe & Burton LLP

(57) ABSTRACT

The invention concerns a method for unparking a motor vehicle (1) from a cross-parking space (8), with which the motor vehicle (1) is manoeuvred along an unparking trajectory (9) at least semi-autonomously from the cross-parking space (8) onto a road (10) bounding on the cross-parking space (8), wherein during said semi-autonomous manoeuvring of the motor vehicle (1) along the unparking trajectory (9), at least one reversing movement is carried out, an end
(Continued)

position (E) is determined and the semi-autonomous manoeuvring of the motor vehicle (1) along the unparking trajectory (9) is ended at the end position (E), wherein the end position (E) is defined as at least a position such that in the event of further movement of the motor vehicle (1) from the end position (E) being carried out, manual control of the motor vehicle (1) in a driving direction (13) predetermined by the road (10) can be carried out by a driver of the vehicle without manoeuvring the motor vehicle (1) in a forward movement.

10 Claims, 3 Drawing Sheets

(51) Int. Cl.
*B60S 9/00* (2006.01)
*G05D 1/00* (2006.01)
*G05D 1/02* (2020.01)

(58) Field of Classification Search
CPC .. G05D 1/00; G08G 1/166; B60S 9/00; B62K 28/165; F16H 59/105
See application file for complete search history.

(56) References Cited

U.S. PATENT DOCUMENTS

| | | | | |
|---|---|---|---|---|
| 9,174,676 | B2* | 11/2015 | Jecker | B62D 15/0285 |
| 2005/0126322 | A1* | 6/2005 | Kozaki | F16H 59/105 |
| | | | | 74/335 |
| 2006/0111219 | A1* | 5/2006 | Kramer | F16H 59/02 |
| | | | | 477/107 |
| 2010/0219010 | A1* | 9/2010 | Kadowaki | B62D 15/0285 |
| | | | | 180/204 |
| 2011/0054739 | A1 | 3/2011 | Bammert et al. | |
| 2013/0335553 | A1* | 12/2013 | Heger | B60Q 9/008 |
| | | | | 348/118 |
| 2014/0058587 | A1* | 2/2014 | Leinfelder | B62D 15/0285 |
| | | | | 701/2 |
| 2014/0058613 | A1* | 2/2014 | Leinfelder | G05D 1/0231 |
| | | | | 701/28 |
| 2014/0200769 | A1* | 7/2014 | Noh | B62D 15/0285 |
| | | | | 701/41 |
| 2015/0088360 | A1* | 3/2015 | Bonnet | B60W 30/06 |
| | | | | 701/23 |
| 2017/0313307 | A1* | 11/2017 | Nordbruch | G05D 1/0212 |

FOREIGN PATENT DOCUMENTS

| | | | |
|---|---|---|---|
| DE | 10 2011 080 148 A1 | 1/2013 | |
| DE | 10 2013 223417 A1 | 6/2015 | |
| EP | 2257458 B1 | 3/2012 | |
| GB | 2 493 446 A | 2/2013 | |
| GB | 2493446 A * | 2/2013 | ............. G08G 1/166 |
| JP | 2012-056428 A | 3/2012 | |
| JP | 2014-189097 A | 10/2014 | |
| JP | 2015-131644 A | 7/2015 | |
| WO | 2011051137 A1 | 5/2011 | |
| WO | WO-2011157556 A1 * | 12/2011 | ......... B62D 15/0285 |

OTHER PUBLICATIONS

The Notification of Reason for Rejection issued in corresponding Japanese Patent Application No. 2018-538223, dated Nov. 1, 2019 (7 pages).
International Search Report issued in PCT/EP2017/051047 dated May 9, 2017 (3 pages).
Written Opinion of the International Searching Authority issued in PCT/EP2017/051047 dated May 9, 2017 (6 pages).
German Search Report issued in DE 10 2016 100 993.8 dated Nov. 4, 2016 (12 pages).

* cited by examiner

METHOD FOR MOVING A MOTOR VEHICLE OUT OF A PARKING SPACE WITH AT LEAST SEMI-AUTONOMOUS MANOEUVRING OF THE MOTOR VEHICLE UP TO AN END POSITION, DRIVER ASSISTANCE SYSTEM AND MOTOR VEHICLE

The present invention concerns a method for unparking a motor vehicle from a cross-parking space, with which the motor vehicle is manoeuvred along an unparking trajectory at least semi-autonomously from the cross-parking space onto a road bounding on the cross-parking space, wherein during said semi-autonomous manoeuvring the motor vehicle carries out at least one reversing movement along the unparking trajectory, an end position is determined and the semi-autonomous manoeuvring of the motor vehicle along the unparking trajectory is ended at the end position. Moreover, the present invention concerns a driver assistance system for a motor vehicle. Finally, the present invention concerns a motor vehicle.

Driver assistance systems are used to assist the driver when driving the motor vehicle. From the prior art, driver assistance systems are known for example, that assist the driver when parking the motor vehicle in a parking space and/or when unparking from the parking space. During this, the motor vehicle can be manoeuvred semi-autonomously. In this case, it can be provided that the driver assistance system carries out an intervention into the steering of the motor vehicle. The driver of the motor vehicle continues to operate the gas pedal and the brakes. Driver assistance systems are also known that manoeuvre the motor vehicle fully autonomously. In this case, the driver assistance system also carries out the intervention into a brake system and a drive motor of the motor vehicle.

In the present case, interest is particularly directed towards unparking from a cross-parking space, whereby the motor vehicle is moved from the cross-parking space in the reversing direction. For this purpose, DE 10 2011 080 148 A1 describes a method, with which lateral limit lines of the cross-parking space are determined. Then a turn direction for an unparking manoeuvre is determined. Furthermore, a reversing path is determined depending on objects bounding on the cross-parking space. Moreover, it is provided that the motor vehicle is oriented in the desired direction of travel at the end of the parking manoeuvre. The motor vehicle and the steering angle are preferably oriented after completion of the unparking process so that the motor vehicle is moving straight along the lane.

It is the object of the present invention to reveal a solution as to how an unparking manoeuvre from a cross-parking space, during which the motor vehicle is manoeuvred at least semi-autonomously, can be carried out more safely.

This object is achieved according to the invention by a method, by a driver assistance system and by a motor vehicle with the features according to the respective independent claims. Advantageous developments of the present invention are the subject matter of the dependent claims.

A method according to the invention is used for unparking a motor vehicle from a cross-parking space. In this case, the motor vehicle is manoeuvred along an unparking trajectory at least semi-autonomously from the cross-parking space onto a road bounding on the cross-parking space, wherein during said semi-autonomous manoeuvring the motor vehicle carries out at least one reversing movement along the unparking trajectory. Moreover, an end position is determined and the semi-autonomous manoeuvring of the motor vehicle along the unparking trajectory is ended at the end position. Furthermore, it is provided that the end position is defined at least as a position such that in the event of further movement from the end position of the motor vehicle, manual driving of the motor vehicle can be carried out by a vehicle driver in a driving direction determined by the road without manoeuvring the motor vehicle in a forward movement.

In the present case, the motor vehicle shall be unparked from a cross-parking space at least semi-autonomously. This can be carried out using a suitable driver assistance system of the motor vehicle. With the driver assistance system, the operator of the vehicle or the driver of the motor vehicle is intended to be assisted when unparking from the cross-parking space. The cross-parking space is used for cross-parking or for perpendicular parking of the motor vehicle. In this case, the motor vehicle is parked at an angle of approximately 90° to the driving direction of the road bounding on the cross-parking space. In the present case, the interest is in unparking procedures, with which the motor vehicle is moved from the cross-parking space in reverse. This is the case if the motor vehicle was parked forwards into the cross-parking space.

For carrying out the unparking process, the motor vehicle is manoeuvred at least semi-autonomously. This means that for example the driver assistance system intervenes in the steering. It can continue to be left to the operator of the vehicle to operate the gas pedal and the brakes. However, it is preferably provided that the motor vehicle is manoeuvred fully autonomously during the unparking process. This means that the driver assistance system intervenes in the steering of the motor vehicle, the brake system and the drive motor. During the unparking, the motor vehicle is manoeuvred from a parked position in the cross-parking space onto the road bounding on the cross-parking space. During this, the motor vehicle is manoeuvred along the unparking trajectory. In principle, the unparking trajectory can be predetermined. The unparking trajectory can also be defined using objects bounding on the cross-parking space. It can also be provided that the unparking trajectory is adjusted when unparking the motor vehicle using sensor data that are detected with sensors of the motor vehicle. In this case, it is provided that the motor vehicle is moved from the cross-parking space in the reversing direction or carries out a reversing movement. The motor vehicle is moved along the unparking trajectory until it has reached an end position. When the end position is reached, the semi-autonomous manoeuvring of the motor vehicle or the autonomous parking manoeuvre is ended. I.e., after reaching the end position, control of the motor vehicle is returned back to the driver.

According to the invention, it is now provided that the end position is defined as at least such a position that in the event of further movement of the motor vehicle from the end position being carried out in the forward direction, manual control of the motor vehicle can be carried out by the operator of the vehicle in the driving direction determined by the road without manoeuvring of the motor vehicle in a forward movement. The road can for example comprise a lane or a directional carriageway having a specified driving direction. Initially, the motor vehicle is manoeuvred or is controlled at least semi-autonomously along the unparking trajectory in the reversing direction. During manoeuvring of the motor vehicle, the position of the motor vehicle can be defined continuously by means of odometry. In addition, objects, in particular objects bounding on the cross-parking space, can be detected with the sensors of the motor vehicle. This enables the position of the motor vehicle relative to the objects to be continuously determined. If the end position is reached, the at least semi-autonomous manoeuvring of the motor vehicle is ended and the motor vehicle is controlled purely manually by the operator of the vehicle. This means that the operator of the vehicle is steering the motor vehicle and operating the gas pedal and the brakes. During manual control, the driver controls the motor vehicle in the forward direction so that the motor vehicle rotates about the vertical axis and is then oriented in the driving direction of the road. The manoeuvring of the motor vehicle along the unparking trajectory is ended if the motor vehicle is located at a position at which it is possible to orient the motor vehicle in a forward path without manoeuvring in the driving direction of the road. In particular, it is provided that during manual control of the motor vehicle a single collision-free forward movement is carried out in order to orient the motor vehicle along the driving direction. The motor vehicle should not be manoeuvred during manual control. This means that during manual control only the forward movement is carried out and no further reversing movements or forward movements. During the forward movement, the motor vehicle is in particular moved along a path from the end position to orientation in the driving direction. Any position can be defined as the end position, from which during manoeuvring on the unparking trajectory under manual control by the vehicle operator, the motor vehicle can be oriented for the first time in a forward movement in the driving direction. A position on the unparking trajectory that is reached at a later point in time when driving on the unparking trajectory can be selected as the end position.

The autonomous unparking manoeuvre can thus be ended if the motor vehicle can be oriented in the driving direction by the driver in a single forward movement—for example while maintaining a predetermined or adjusted steering angle. Compared to known systems, in which the autonomous unparking manoeuvre is ended if the motor vehicle is already oriented in the driving direction, the advantage arises here that control can be handed back much earlier to the driver of the motor vehicle. This means overall that the driving manoeuvre or the unparking manoeuvre can be ended faster. The probability is thus reduced that the traffic on the road will be hindered by the unparking motor vehicle or that a collision will occur between the motor vehicle and a further vehicle that is moving on the road. In this way, overall the autonomous unparking of the motor vehicle from the cross-parking space can be carried out more safely.

In particular, a method for defining an end position of an at least semi-autonomously traversed unparking trajectory is thus also proposed, in particular in an at least semi-autonomous and manual mixed unparking process to achieve the driving direction.

At least one object is preferably detected that bounds on the cross-parking space, and the end position is determined such that manual control is possible in a forward movement past the at least one object without collisions. Using sensors of the motor vehicle or the driver assistance system of the motor vehicle, objects can be detected that bound on the cross-parking space. The sensor can be for example an ultrasonic sensor, a radar sensor, a laser sensor or a camera. Furthermore, it can be provided that the sensor data that is provided by the sensors are analysed by the controller of the motor vehicle. Said objects can in particular be parked vehicles that are parked in adjacent cross-parking spaces. In this case, the end position can be defined such that during manual control of the motor vehicle by the driver, no collision occurs between the motor vehicle and the at least one object bounding on the cross-parking space. In other words, the motor vehicle is reversed along the unparking trajectory until it can be steered past the objects bounding on the cross-parking space without collisions. In this case, the end position can be selected differently, depending on whether there are objects that are bounding on the cross-parking space or not. Damage to the motor vehicle or the objects that are bounding on the cross-parking space can thus be reliably prevented.

In a further embodiment, a distance between the at least one object and the motor vehicle is continuously determined for detecting the at least one object during the manoeuvring of the motor vehicle along the unparking trajectory. This enables the distance between the motor vehicle and the object or the relative position between the motor vehicle and the object to be continuously corrected. Thus, for example, the distance between the motor vehicle and the object can be continuously determined using ultrasonic sensors that are distributively disposed on the motor vehicle. During this, the fact is used that the motor vehicle is moved along the unparking trajectory relative to the objects bounding on the parking space during manoeuvring. Thus, accurate information about the objects can be obtained during the unparking process. Overall, this enables more precise determination of the end position.

Furthermore, it is advantageous if the end position is defined in such a way that manual control of the motor vehicle in a forward movement past the at least one object at a predefined safety distance is possible. In principle, it is known to take into account a suitable safety distance during autonomous manoeuvring of a motor vehicle past an object or obstacle in order to exclude collisions between the motor vehicle and the object as a result of measurement inaccuracies. In the present case, it is provided that an additional safety distance is taken into account, at which the motor vehicle or the external surface of the body of the motor vehicle should be passed by the parked vehicle. This enables it to be taken into account that the driver of the motor vehicle does not steer exactly with a predefined steering angle during manual driving. It can also be taken into account that on reaching the end position a steering angle is set that enables collision-free forward movement. Owing to the additional safety distance, it can be taken into account that during manual driving of the motor vehicle the driver is not holding the steering wheel or is carrying out a small steering movement. Thus, it can also be taken into account that the driver is not moving the motor vehicle at a predefined speed. Owing to the additional safety distance, the vehicle can be moved past the objects safely and without collisions, even if the driver is not accurately maintaining the predefined or adjusted steering angle.

In a further embodiment, the end position is determined under the assumption that a predefined steering angle, in particular a maximum steering angle, is set during manual control of the motor vehicle. Said set steering angle is in particular selected so that the driver can carry out the collision-free forward movement without changing the adjusted steering angle. Furthermore, for example a driving path can be defined that describes the future movement of the motor vehicle during the forward movement during manual driving. Here, the end position can be defined in such a way that said driving path passes the objects bounding on the parking space. Said driving path is dependent on the steering angle that the driver assistance system of the motor vehicle can specify at the end position. In particular, the end position can be defined under the assumption that a maximum steering angle is selected. The end position is thus determined so that the driver of the motor vehicle can move on the lane of the road if he turns the steering wheel fully. Thus, on the one hand it can be achieved that the motor vehicle does not move onto the opposite carriageway or not too far onto the opposite carriageway. Furthermore, it can also be ensured that the motor vehicle can be moved on the desired lane in the single forward movement.

Furthermore, it is advantageous if the specified steering angle at the end position is set by means of a driver assistance system of the motor vehicle. If the end position is reached, the driver assistance system can intervene in the steering of the motor vehicle once again and can orient the steerable wheels of the motor vehicle in such a way that the steering has the predefined steering angle. In this case it can be provided that the motor vehicle is stopped at the end position and the wheels are turned by means of the driver assistance system while the motor vehicle is stationary. Thus, as far as possible it is unnecessary to move the motor vehicle on the opposite carriageway. Furthermore, this is suitable if the road is bounded by corresponding limiting elements.

In a further embodiment, after reaching the end position a forward gear is engaged or an instruction to engage the forward gear is issued to the driver of the motor vehicle. After the end position is reached, the driver assistance system itself can change from the reverse gear into the forward gear. A gear change can thus be carried out by the driver assistance system. This enables the driver of the motor vehicle to take over directly and rapidly. It can also be provided that a corresponding output is issued to the driver of the motor vehicle. Said output can for example be output visually, audibly or haptically. In principle, said output can advise the driver of the vehicle that he should engage the forward gear. The output can further contain the information that the automatic or autonomous unparking manoeuvre is now ended. Thus, a safe handover from the driver assistance system to the driver of the motor vehicle can be carried out.

It is in particular provided that the at least semi-autonomous manoeuvring of the motor vehicle is ended, or the control of the motor vehicle is handed over to the driver, if the end position is reached, the specified steering angle has been set by the driver assistance system and the forward gear has been engaged. In this case, the forward gear may have been engaged by the driver or the driver assistance system.

Furthermore, it is advantageous if a limiting element is detected that bounds on the road on a side opposite the cross-parking space, and the end position is determined depending on the detected limiting element. A limiting element of this type can for example be a wall, a guard rail, a plant, a kerb, a parked vehicle or similar. The limiting element preferably bounds on the road on a side opposite to the cross-parking space. During the unparking process, a check can be carried out using the sensors as to whether a limiting element of this type is present or not. Depending thereon, the end position can then be defined. In principle, it can also be provided that a limiting element is detected that separates a lane or a directional carriageway from another lane or another directional carriageway. Thus, the end position can be accurately defined depending on the layout of the road.

If it is necessary owing to the presence of the limiting element, a forward movement and a further reversing movement are carried out for manoeuvring the motor vehicle along the unparking trajectory. If for example no end position can be reached during the first reversing movement, with which the motor vehicle is moved out of the cross-parking space, a forward movement and then a further reversing movement can be carried out. The performance of the forward movement and the subsequent reverse movement can also be carried out multiple times. It can thus be provided that the motor vehicle is moved back and forth until the end point can be reached. This is for example the case if the road or the road bounding on the cross-parking space is limited by a limiting element.

A driver assistance system according to the invention for a motor vehicle is designed to carry out a method according to the invention. The driver assistance system can for example comprise a controller or an electronic control unit, with which during the unparking manoeuvre control signals are output to the steering system of the motor vehicle and possibly to the brake system and/or the drive motor. Thus, an autonomous unparking manoeuvre can be carried out using the driver assistance system.

A motor vehicle according to the invention comprises a driver assistance system according to the invention. The motor vehicle is in particular embodied as a passenger vehicle.

The preferred embodiments and the advantages thereof presented in relation to the method according to the invention apply accordingly to the driver assistance system according to the invention and to the motor vehicle according to the invention.

Further features of the invention arise from the claims, the figures and the description of the figures. The features and combinations of features mentioned above in the description, and the features and combinations of features mentioned below in the description of the figures and/or shown in the figures alone can be used not only in the respective specified combination, but also in other combinations or on their own without departing from the scope of the invention. Thus, embodiments of the invention are to be considered as included and disclosed that are not explicitly shown and described in the figures, but that arise and can be produced from separate combinations of features of the described embodiments. Embodiments and combinations of features are also to be considered as disclosed that do not thereby comprise all the features of an originally formulated independent claim.

The invention is now explained in detail using preferred exemplary embodiments and with reference to the accompanying drawings.

In the figures.

In the figures, identical and functionally identical elements are provided with the same reference characters.

Figure 1:
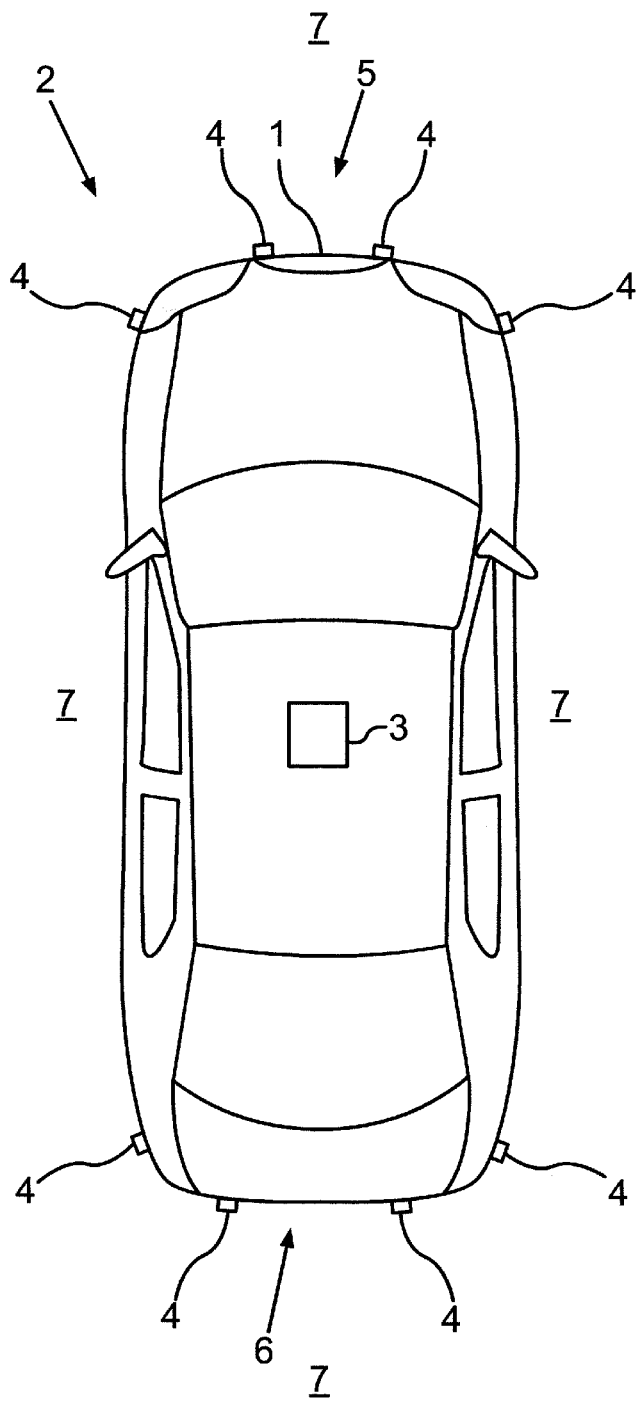
FIG. 1 shows a motor vehicle according to an embodiment of the present invention comprising a driver assistance system.
Figure 2:
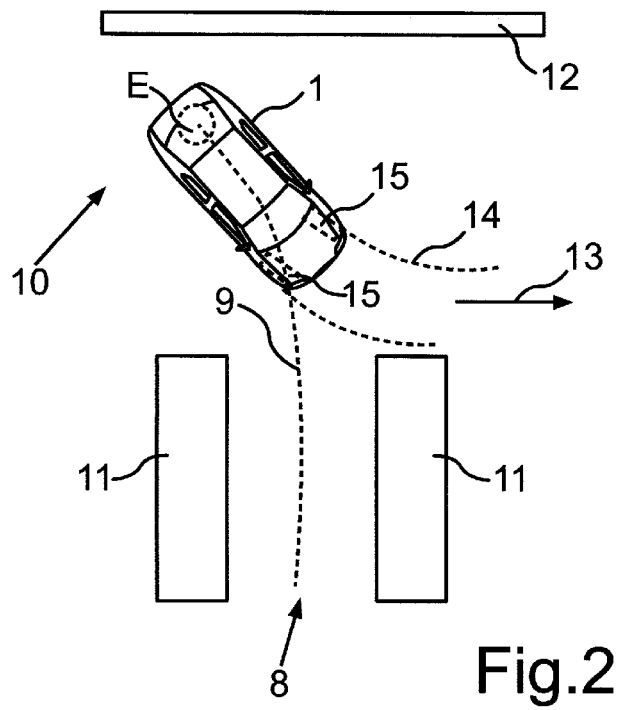
FIG. 2 shows the motor vehicle, which is being unparked in reverse from a cross-parking space according to a first embodiment.

FIG. 1 shows a motor vehicle 1 according to an embodiment of the present invention in a top view. In the present case, the motor vehicle 1 is embodied as a passenger vehicle. The motor vehicle 1 comprises a driver assistance system 2 that is used to assist a driver of the motor vehicle 1 when driving the motor vehicle 1. The driver assistance system 2 comprises in turn a controller 3, which for example can be formed by an electronic control unit (ECU—Electronic Control Unit) of the motor vehicle 1.

Moreover, the driver assistance system 2 comprises at least one sensor 4. In the present exemplary embodiment, the driver assistance system 2 comprises eight sensors 4, which are embodied as ultrasonic sensors for example. There are four sensors 4 disposed in a front region 5 and four sensors 4 disposed in a rear region 6 of the motor vehicle 1. With the sensors 4, objects or obstacles are detected in a region 7 surrounding the motor vehicle 1. The sensors 4 are connected to the controller 3 for data transmission. A corresponding data line is not shown for the sake of clarity in the present case. Thus, the controller 3 can suitably analyse the sensor data that are provided with the sensors 4. Thus for example, the objects or obstacles in the surrounding region 7 can be identified.

The driver assistance system 2 is also embodied to continuously detect a movement of the motor vehicle 1 by means of odometry. The controller 3 can thus also receive data from a speed sensor and/or a steering angle sensor, for example. Moreover, the controller 3 is designed to output corresponding control signals to the steering system of the motor vehicle 1. Thus, an intervention into the steering of the motor vehicle can be carried out using the driver assistance system 2. This enables semi-autonomous manoeuvring of the motor vehicle 1.

Using the driver assistance system 2, the motor vehicle 1 is intended to be manoeuvred at least semi-autonomously from a cross-parking space 8 during an unparking process. In the present case, the motor vehicle 1 has been parked forwards into the cross-parking space 8. Thus, the motor vehicle 1 is initially moved in the reversing direction when unparking. In the present case, the motor vehicle 1 is manoeuvred along an unparking trajectory 9. During this, the motor vehicle 1 is moved out of the cross-parking space 8 onto a road 10. The road 10 can for example comprise two lanes or two directional carriageways that are not shown in detail here.

During the manoeuvring of the motor vehicle 1 along the unparking trajectory 9, the surrounding region 7 and in particular objects 11 bounding on the cross-parking space 8 are detected with the sensors 4. The objects 11 can in particular be parked vehicles that are parked in adjacent cross-parking spaces. During the unparking of the motor vehicle 1, the distance between the motor vehicle 1 and the respective objects 11 can be continuously detected. In this way, the position of the motor vehicle 1 relative to the objects can 11 be determined. In addition, the current position of the motor vehicle 1 can be determined by means of odometry. Moreover, it is provided that a limiting element 12 bounding on the road 10 is detected by means of the sensors 4. The limiting element 12 can be a wall, for example.

It is now provided that the motor vehicle 1 is moved on the unparking trajectory 9 until it has reached an end position E. During this, the end position E is determined so as to describe the position from which the motor vehicle 1 can be moved manually by the driver in a driving direction 13 of the road 10 or in a lane of the road 10. The driving direction 13 is specified and runs perpendicular to a main direction of the cross-parking space 8. In this case, it can be provided that the motor vehicle 1 is manoeuvred to the end position E at least semi-autonomously, and after reaching the end position E the motor vehicle 1 is controlled manually by the driver of the motor vehicle 1. In this case, the end position E is determined so that the motor vehicle 1 can be oriented along the driving direction 13 in a single forward movement starting from the end position E. In this case, it is provided that during the movement of the motor vehicle 1 along the unparking trajectory 9, a driving path 14 is continuously determined that describes the movement of the motor vehicle 1 during the forward movement.

The end position E is also determined depending on the objects 11 bounding on the cross-parking space 8. In particular, the end position E is determined so that during the forward movement, during which it is steered manually by the driver of the motor vehicle 1, the motor vehicle 1 can be moved past the objects 11 with no collisions. In this case, an additional safety distance can be defined, at which the motor vehicle 1 is moved past at least one of the objects 11. Furthermore, the end position E can be defined so that the motor vehicle 1 can be moved past the at least one object 11 in the forward movement by setting a predefined steering angle, in particular by setting a maximum steering angle. The control of the motor vehicle 1 is thus handed over from the driver assistance system 2 to the driver of the motor vehicle 1 once the forward movement passes the at least one object 11 with no collisions with setting of the maximum or the predefined steering angle. This means that at the time of deactivating the driver assistance system, the motor vehicle 1 is not oriented along the predefined driving direction 13, but is still at a relatively large angle to the final driving direction 13. The advantage of this is that control is handed back to the driver of the motor vehicle 1 much sooner and the manoeuvre can thus be ended faster.

If the end position E is reached, it can further be provided that the specified steering angle or the maximum steering angle is set by the driver assistance system 2. For this purpose, an intervention into the steering can be carried out with the driver assistance system 2 and thus the steerable wheels 15 of the motor vehicle 1 are steered accordingly. It can also be provided that the forward gear is engaged after reaching the end position by means of the driver assistance system 2. Alternatively, it can also be provided that an output is issued to the driver that instructs him to engage the forward gear. If the end position E is reached, the specified steering angle is set and the forward gear is engaged, the autonomous unparking manoeuvre can be ended and handed over to the driver.

Figure 3:
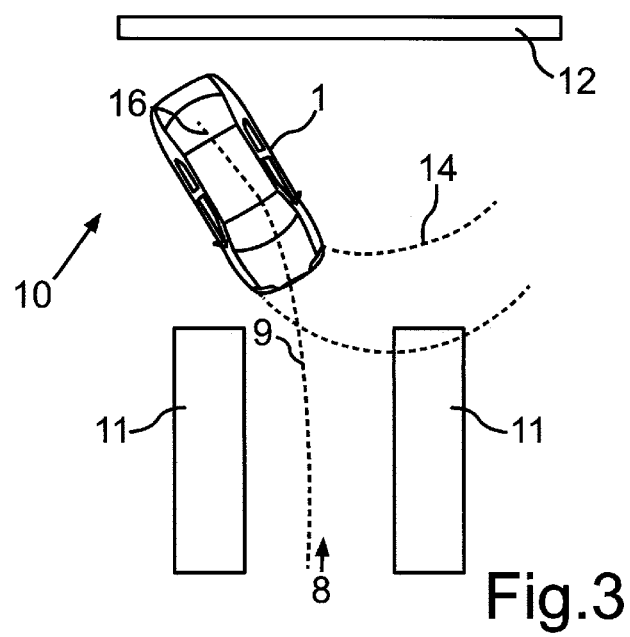
FIG. 3-5 show individual steps of the unparking of the motor vehicle from the cross-parking space according to a further embodiment.

FIG. 3 shows the motor vehicle 1 in a further traffic situation. Here too, the motor vehicle 1 is being moved out of the cross-parking space 8 along the unparking trajectory 9. Because of the arrangement of the parking limiting elements 12 however, the end position E cannot be reached. In this case, the end position E would lie behind the limiting element 12 or the wall. If the motor vehicle 1 were to be moved in the forward movement with the maximum steering angle set starting from the position shown in FIG. 3, it would collide with the object 11.

Figure 4:
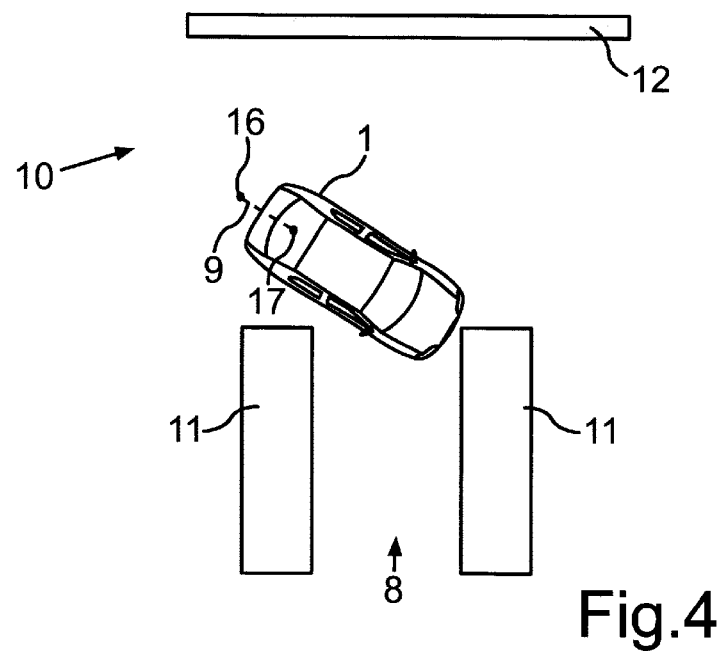
Figure 5:
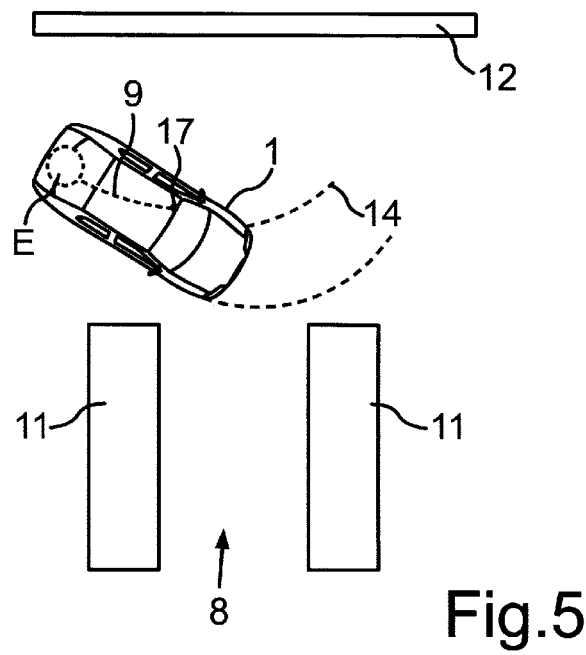

In this case, it is provided that the motor vehicle 1 carries out a forward movement starting from an intermediate point 16 of the unparking trajectory 9. This is shown in FIG. 4. During this, the motor vehicle 1 is moved to a predefined minimum distance from the object 11, so that a further intermediate position 17 is reached. As can be seen from FIG. 5, the motor vehicle 1 is moved to the end position E in a further reversing movement along the unparking trajectory 9 starting from said further intermediate position 17. Starting from said end position E, the motor vehicle 1 can then be moved past the object 11 with no collisions.

The invention claimed is:
1. A method for unparking a motor vehicle from a cross-parking space, comprising:
   maneuvering the motor vehicle along an unparking trajectory at least semi-autonomously from the cross-parking space onto a road bounding on the cross-parking space;

during said semi-autonomous maneuvering of the motor vehicle along the unparking trajectory, carrying out at least one reversing movement;

determining an end position, wherein the semi-autonomous maneuvering of the motor vehicle along the unparking trajectory is ended at the end position, defined as at least a position such that in the event of further movement of the motor vehicle being carried out from the end position, manual control of the motor vehicle in a driving direction predetermined by the road is carried out by a driver of the vehicle without maneuvering the motor vehicle in a forward movement, wherein the at least one reversing movement is carried out to move the motor vehicle from inside of the cross-parking space to the end position that is outside of the cross-parking space; and after reaching the end position, engaging a forward gear, by a driver assistance system, so that the driver manually moves the motor vehicle forward, or issuing an instruction, by the driver assistance system to the driver of the motor vehicle, to engage the forward gear so that the driver manually moves the motor vehicle forward.

2. The method according to claim 1, wherein at least one object is detected that bounds on the cross-parking space, and the end position is determined such that manual control in a forward movement past the at least one object without collisions is possible.

3. The method according to claim 2, wherein a distance between the at least one object and the motor vehicle is continuously determined for detecting the at least one object during the maneuvering of the motor vehicle along the unparking trajectory.

4. The method according to claim 2, wherein the end position is defined in such a way that manual control of the motor vehicle past the at least one object at a predefined safety distance in a forward movement is possible.

5. The method according to claim 1, wherein the end position is determined under an assumption that a predefined steering angle, in particular a maximum steering angle, is set during manual control of the motor vehicle.

6. The method according to claim 5, wherein the specified steering angle at the end position is set by means of the driver assistance system of the motor vehicle.

7. The method according to claim 1, wherein a limiting element is detected that bounds on the road on a side opposite the cross-parking space, and the end position is determined depending on the detected limiting element.

8. The method according to claim 1, wherein a forward movement and a further reversing movement are carried out for maneuvering the motor vehicle along the unparking trajectory.

9. The driver assistance system for the motor vehicle that is configured to carry out the method according to claim 1.

10. The motor vehicle with the driver assistance system according to claim 9.

\* \* \* \* \*